(12) United States Patent
Gregoire et al.

(10) Patent No.: US 8,584,223 B2
(45) Date of Patent: Nov. 12, 2013

(54) METHOD OF PROTECTING ACCESS TO DATA ON A NETWORK

(75) Inventors: Louis Gregoire, Cassis (FR); Alexis Pottier, la Bouilladisse (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/389,528

(22) PCT Filed: Aug. 18, 2010

(86) PCT No.: PCT/EP2010/062022
§ 371 (c)(1),
(2), (4) Date: Feb. 8, 2012

(87) PCT Pub. No.: WO2011/029703
PCT Pub. Date: Mar. 17, 2011

(65) Prior Publication Data
US 2012/0144474 A1    Jun. 7, 2012

(30) Foreign Application Priority Data

Sep. 11, 2009 (EP) .................................. 09290694

(51) Int. Cl.
*H04L 29/06* (2006.01)
(52) U.S. Cl.
USPC ............... 726/9; 713/150; 713/153; 713/172; 709/201; 709/217; 709/229; 709/231; 709/232
(58) Field of Classification Search
USPC ........................................................... 726/9
See application file for complete search history.

(56) References Cited

U.S. PATENT DOCUMENTS

| 2001/0037452 | A1* | 11/2001 | Go et al. | 713/168 |
| 2002/0194299 | A1* | 12/2002 | Yasaki et al. | 709/217 |
| 2003/0028505 | A1* | 2/2003 | O'Rourke et al. | 707/1 |
| 2003/0126611 | A1* | 7/2003 | Chernock et al. | 725/105 |
| 2003/0131353 | A1* | 7/2003 | Blom et al. | 725/25 |
| 2003/0140257 | A1* | 7/2003 | Peterka et al. | 713/201 |
| 2003/0200442 | A1* | 10/2003 | Bhat et al. | 713/182 |
| 2006/0005258 | A1* | 1/2006 | Hirose | 726/27 |
| 2006/0200541 | A1* | 9/2006 | Wikman et al. | 709/223 |

FOREIGN PATENT DOCUMENTS

| WO | 97/26611 A | 7/1997 |
| WO | 2006/101988 A2 | 9/2006 |
| WO | 2007/109162 A2 | 9/2007 |
| WO | WO 2008068963 A1 * | 6/2008 |

OTHER PUBLICATIONS

Wu et al., Flexible access to video streaming, Sep. 2004, IEEE Vehicular Technology Conference 2004, vol. 4, pp. 2568-2571.*

(Continued)

*Primary Examiner* — Taghi Arani
*Assistant Examiner* — Kenneth Chang
(74) *Attorney, Agent, or Firm* — Buchanan Ingersoll & Rooney PC

(57) ABSTRACT

The invention is a method of managing access to a plurality of data from a server by a client through a point-to-point link. Each of the data is reachable through a set of URIs that belongs to an index list. The method comprises the step of inserting a request to a control message in the index list. The control message applies to a data reachable through one URI belonging to the index list.

9 Claims, 3 Drawing Sheets

(56) References Cited

OTHER PUBLICATIONS

* International Search Report (PCT/ISA/210) issued on Nov. 19, 2010, by European Patent Office as the International Searching Authority for International Application No. PCT/EP2010/062022.

Written Opinion (PCT/ISA/237) issued on Nov. 19, 2010, by European Patent Office as the International Searching Authority for International Application No. PCT/EP2010/062022.

International Preliminary Report on Patentability (Form PCT/IB/373) dated Mar. 13, 2012, issued in corresponding International Application No. PCT/EP2010/062022. (1 pages).

* cited by examiner

METHOD OF PROTECTING ACCESS TO DATA ON A NETWORK

FIELD OF THE INVENTION

The present invention relates to methods of protecting access to data on a network. It relates particularly to methods of protecting access to data sent between two entities through the Internet network.

PRIOR ART

On a network, data is generally provided by a server through a dedicated Uniform Resource Identifier, also named URI. In particular Uniform Resource Locator (URL) is a kind of URI. The exchanges of data between a client and a server over a network may require the protection of the data conveyed through the network. The security of the exchanged data may rely on the public key scheme. The data protection may also be carried out with a session key which is known by both sides. In such a case the session key is called symmetric key. For high secure sessions, several session keys may be successively used during a unique session.

In the domain of TV over IP, a large amount of data must be transported over Internet network. Streaming refers to the technology allowing delivery of real-time or "Video On Demand" services—such as video or audio—from a server to a client over a network. There are several protocol standards available to do streaming over an IP network. The streaming over Internet requires specific means which allows guaranteeing the Quality of Service (QoS). HTTP streaming is a particular case of Internet streaming where the media (video, audio) traffic is carried over the HTTP protocol. This allows going naturally through firewalls and Network Address Translation (NAT) gateways. In HTTP Streaming, a media file, like movie, is split into a number of smaller media files on the server. The HTTP client recovers the initial file by consecutive HTTP requests to the web streaming server. Web streaming is becoming a leading streaming technology fostered by the mains actors in this domain. Content delivery networks (CDN) consist in a network of cache servers spread over the edge of Internet. The role of these servers is to cache frequently accessed and/or big content in places closer to the clients accessing it in order to improve QoS. The CDN framework allows a short lead-time for requests. The initial server redirects requests to the optimal cache servers. In the case of web streaming over a CDN, the consecutive files are cached possibly over several edge servers. With the growth of video services over the Internet, CDN are more and more used.

The main solution for service protection is encryption between the server and the client. This can be done using classical Internet solutions such as Internet Protocol Security (IPSEC), Transport Layer Security (TLS), or any relevant known security mechanism. In case of web streaming, the natural solution for encryption is to deliver the content over a TLS session. But this solution does not scale if the server has to manage 10s of thousands to million of concurrent secure one-to-one connections. Moreover there is a need for providing a secure streaming mechanism over Internet compatible with CDNs.

SUMMARY OF THE INVENTION

An object of the invention is to solve the above mentioned technical problem.

The object of the present invention is a method of managing access to a plurality of data from a first entity by a second entity through a point-to-point link. Each of said data is reachable through a set of URIs that belongs to an index list. The method comprises the step of inserting a request to a control message in the index list. Said control message applies to a data which is reachable through one URI that belongs to the index list.

Advantageously, the control message may apply to a set of data which are reachable through a set of URIs belonging to the index list.

The request to control message may be an URI targeting a remote server.

Advantageously, the second entity may comprise a personal token. In response to said request the remote server may send both a control message and a re-direct request to an URI targeting a local server embedded in the personal token.

Said personal token may be a smart card.

Alternately, the second entity may comprise a personal token and the request to a control message may be an URI targeting a local server which is embedded in the personal token.

Advantageously, said data intended to be distributed may be web streaming content. The control message may be coupled with a descrambling key.

Another object of the invention is a method of managing access to a plurality of data from a first entity by a second entity through a point-to-point link. Each of said data is reachable through a set of URIs belonging to an index list. Said second entity comprises a personal token which embeds a local server. The method comprises the step of inserting a request to a descrambling key in the index list. Said request to a descrambling key is an URI targeting the local server.

Another object of the invention is a streaming Web server intended to distribute a plurality of data to a distant entity through a point-to-point link. The streaming web server comprises an index list. Each of said data is reachable through a set of URIs belonging to the index list. The index list comprises a request to a control message. Said control message applies to a data reachable through one of the URIs belonging to the index list.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of server entity and to any types of client entity which are able to manage URI.

The client entity may be a unique device that embeds software application able to generate the required secret data. The client entity may also be a couple made of a host machine and a hardware secure token.

The invention may apply to any types of data exchanged between two entities through a network like Internet. For example, the exchanged data may be files, HTML pages, scripts, applications or audio/video content. In particular, the invention is well-suited for protecting TV streaming over the Internet network.

The invention relies on the association of control messages to elementary data intended to be transported over a network. According to an embodiment of the invention, a unique video file may be split in a plurality of ordered segments. These segments may be made available at a corresponding series of URI. The control messages associated to the segments have two functions. Each control message carries a key which is required for deciphering a segment. Each control message may carry a description of at least one access condition that the client entity should fulfill to be allowed to access the associated segment.

An advantage of the invention is to allow a flexible and dynamic definition of access conditions which is compatible with massive scale.

Another advantage of the invention is to allow the real-time definition of access conditions. This is useful for live events for example.

The invention is consistent with the current web streaming standards.

Figure 1:
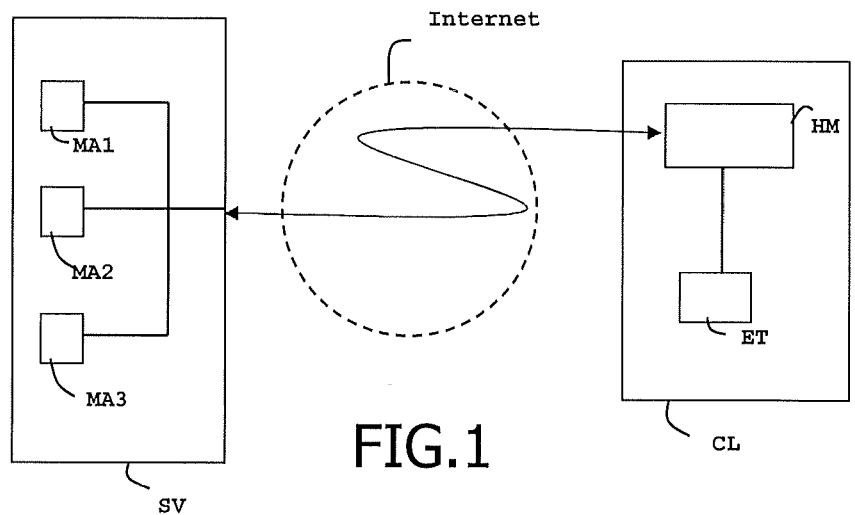
FIG. 1 is a first example of system comprising a server entity and a client entity according to the invention.

FIG. 1 shows an example of system comprising a server entity SV that provides a client entity CL with access to a data through the Internet network according to the invention.

In this example, the server entity SV is made of three machines MA1, MA2 and MA3. The machine MA1 is a streaming Web server able to provide video content intended to be distributed. The machine MA2 is a control center able to provide a service key SK. The machine MA3 is a cache server of CDN type. MA3 is able to provide a copy of the video content initially stored in MA1.

In this example, the client entity CL comprises a host machine HM and a personal token ET connected to the host machine HM. The personal token ET may be a hardware secure token or a software secure token. The hardware secure token may be a smart card.

In particular, the hardware OTP token ET may contain a microprocessor, a communication interface, a non volatile memory, and a working memory. The working memory may be a RAM memory. The communication interface may be intended to be connected to a host machine for exchanging data. The communication interface may be a contactless or a contact interface. The non volatile memory may be an EEPROM or a Flash memory. The non volatile memory may contain an operating system, a token identifier. The operating system OS may comprise a virtual machine, in particular a Java® virtual machine or a .Net® virtual machine. The microprocessor cooperates with the working memory and is intended to run the operating system.

Figure 2:
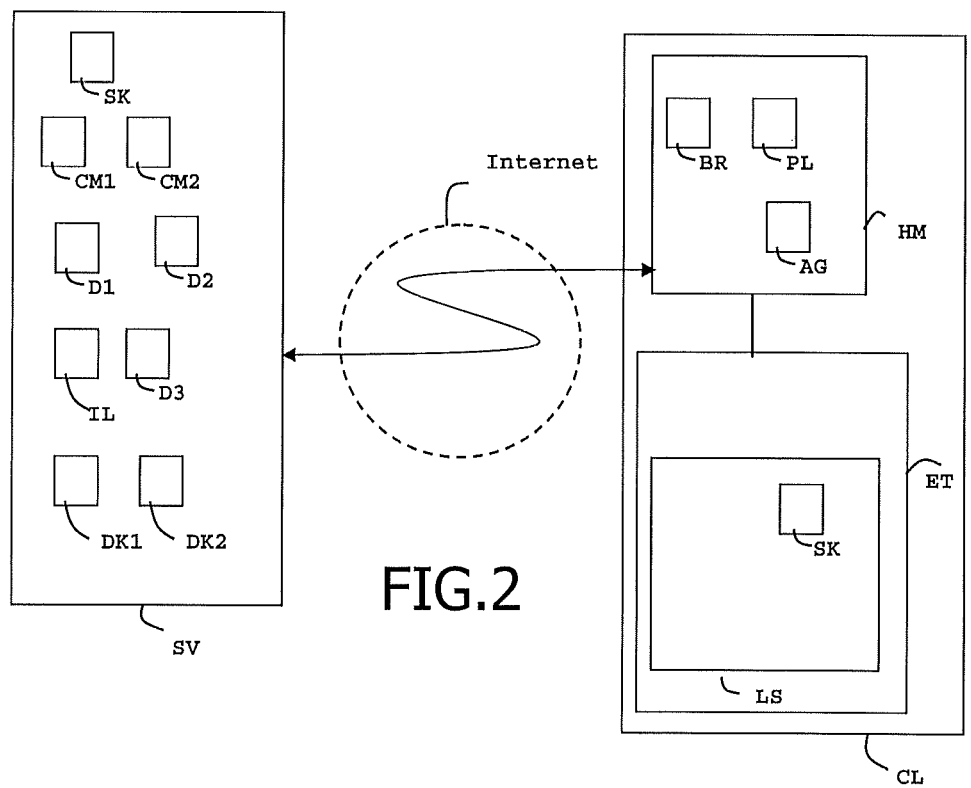
FIG. 2 is a second example of a system comprising a server entity and a client entity according to the invention.

FIG. 2 shows another example of system comprising a server entity SV that provides a client entity CL with access to data D1, D2 and D3 through the Internet network.

In this example, the server entity SV is made of a unique machine which acts as both a streaming Web server and a control center.

The server entity SV comprises three data D1, D2 and D3 intended to be distributed to the client entity CL. The entity SV comprises two control messages CM1 and CM2, an index list IL, a service key SK and two scrambling keys DK1 and DK2. For example the scrambling key may be compliant with the Advanced Encryption Standard also named AES.

In this example, the client entity CL comprises a host machine HM and an hardware secure token ET connected to the host machine HM.

The host machine HM comprises web browser BR, a media player PL and an agent AG. The agent AG is able to manage control messages and to communicate with the token ET.

The token ET comprises a local server LS. The local server LS comprises the service key SK.

The service key SK is a secret value shared between the server entity SV and the client entity CL. The key SK is assumed to have been deployed in a secure way from the server entity SV or securely generated into the client entity CL.

Figure 3:
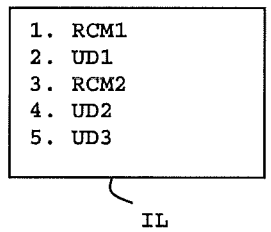
FIG. 3 depicts a first example of Index list generated according to the invention.

FIG. 3 shows an example of Index list generated according to the invention.

The index list IL comprises five elements. The first element RCM1 is a request to the control message CM1. The second element UD1 is an URL where the data D1 is made reachable. The third element RCM2 is a request to the control message CM2. The fourth element UD2 is an URL where the data D2 is made reachable. The fifth element UD3 is an URL where the data D3 is made reachable. According to a preferred mode of use, each request to control message is placed before its set of associated URLs. In the example of FIG. 3, the control message CM1 applies to D1 and the control message CM2 applies to D2 and D3.

Figure 4:
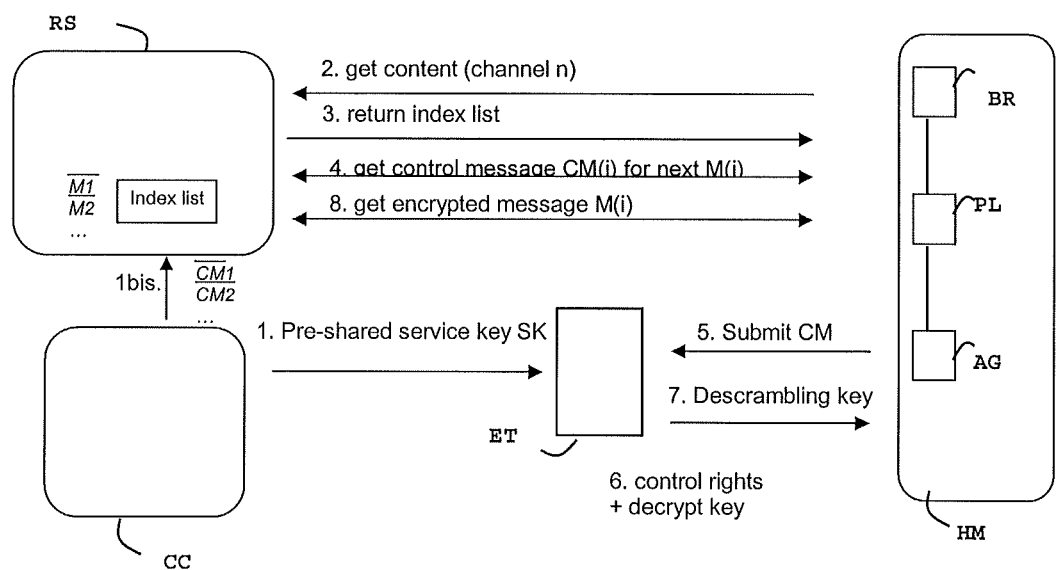
FIG. 4 shows an example of messages sequence exchanged between a server entity and a client entity according to the invention.

FIG. 4 shows an example of messages sequence exchanged between a server entity and a client entity according to the invention.

In this example, the server entity is made of two machines RS and CC. The machine RS is a streaming web server able to provide video content intended to be distributed to client entities through streaming mechanism. The machine CC is a control center able to provide a service key SK. In this example, the client entity CL is made of two parts HM and ET. The host machine HM is a personal computer and ET is a smart card connected to the computer HM. The service key SK is assumed to be securely sent to the token ET in order to be shared by both server and client side. The personal computer HM comprises a web browser BR, a media player PL and an agent AG. The agent AG is able to communicate with the token ET. For example, the media player PL may be Quicktime®, SilverLight® client of Microsoft® or any HTTP streaming media player.

When the client entity wants to get the video streaming, a first get content request is sent by the browser BR to the server RS. In response, the server RS sends the index list, also named a play list. The index list may be seen as a recipe that explains how to get the video data. Then the computer HM sends a HTTP request to get the first control message which applies to the URL that follows in the index list.

Then the agent AG sends the received control message to the token ET. The token ET uses the service key SK for retrieving the descrambling key from the control message and for controlling the rights contain in the control message. Thus the access to the video data may be controlled according to various and dynamic criteria. In particular, the following criteria may be checked: subscription rights, pay per view rights, pay-per time rights, Impulse pay per view, free sliding preview, multichannel package content and parental control. The control message allows the token of the client entity to increase the security. Thus the token may check usage conditions, may verify a secret code or a signature.

For example the control message may comply with STKM as defined by the OMA BCast standard.

Then the token ET sends the descrambling key to the computer HM. At a further step, the computer sends a HTTP request to the URL that follows in the index list. In response, the server RS sends a first encrypted video data through a message M1. Then the agent AG deciphers the received encrypted video data thanks to the descrambling key. Then the player P1 is able to play the first video data. The above-described steps are repeated for getting the further video data. Thus the computer HM receives the successive segments of the video streaming. Usually, a video content, like a movie, is split in segments of ten seconds. The play list file can be updated during the segment consumption.

The above-described method may be executed with the index list IL which is shown at FIG. 3. In this embodiment, the index list comprises two requests to control message which are inserted before the set of URLs addressing the data related to the respective control message. Thus the first request RCM1 allows the computer HM to get the first control message CM1 which applies to video data D1. The URL UD1 allows the computer HM to get the scrambled video data D1. Thank to the method, the computer HM is able to descramble the received data D1. The second request RCM2 allows the computer HM to get the second control message CM2 which applies to the URL set made of UD2 and UD3. In other words, the second control message CM2 applies to both video data D2 and D3. The URLs UD2 and UD3 allow the computer HM to get the two scrambled video data D2 and D3. Thus the computer HM is able to descramble the received data D2 and D3.

Figure 5:
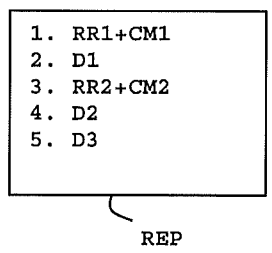
FIG. 5 depicts an example of response to the requests contained in an Index list generated according to the invention.

FIG. 5 shows an example of responses to the requests contained in an Index list generated according to a specific embodiment.

In one embodiment, the response REP corresponds to the Index list of FIG. 3.

Figure 6:
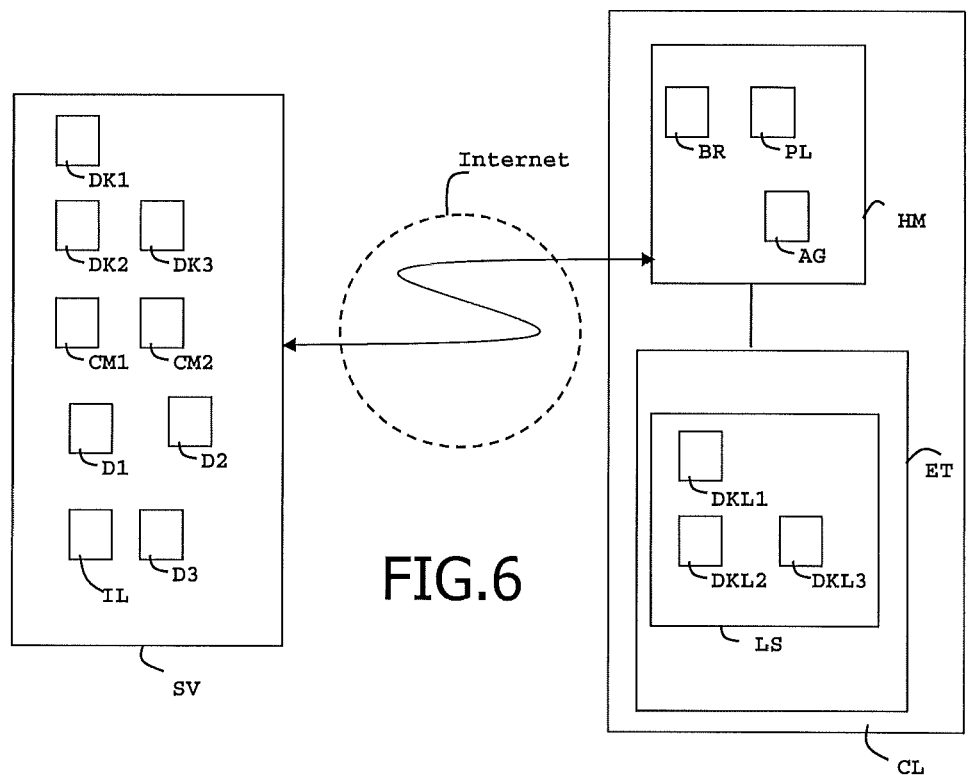
FIG. 6 is a third example of a system comprising a server entity and a client entity.

The response REP comprises five elements. The first element is a couple (RR1, CM1). RR1 is an HTTP re-direct request to an URL targeting the local server LS. CM1 is a control message applying to the data D1. The second element D1 is the scrambled data reachable at the URL UD1. The third element is a couple (RR2, CM2). RR2 is an HTTP re-direct request to an URL targeting the local server LS. CM2 is a control message applying to the data D2 and D3. The fourth element D2 is the scrambled data that can be retrieved at the URL UD2. The fifth element D3 is the scrambled data that can be retrieved at the URL UD3. In the example of FIG. 5, the HTTP re-direct request RR1 allows to get a descrambling key that applies to D1 and the re-direct request RR2 allows to get a descrambling key that applies to D2. In a preferred embodiment, the local server LS is a smart card web server as defined by the OMA Smartcard Web Server V1.0 standard. The local server LS comprises a means able to decipher or generate the descrambling keys by using the service key SK. In the example of FIG. 3, D1 is scrambled with DK1 in server side. D2 and D3 are scrambled with DK2. D1 is descrambled with DK1 in client side. D2 and D3 are descrambled with DK2 in client side FIG. 6 shows another example of system comprising a server entity SV that provides a client entity CL with access to data D1, D2 and D3 through the Internet network.

In this example, the server entity SV is made of a unique machine which acts as a streaming Web server.

The server entity SV comprises three data D1, D2 and D3 intended to be distributed to the client entity CL. The entity SV comprises two control messages CM1 and CM2, an index list IL and three scrambling keys DK1, DK2 and DK3.

In this example, the client entity CL comprises a host machine HM and an hardware secure token ET connected to the host machine HM.

The host machine HM comprises web browser BR, a media player PL and an agent AG. The agent AG is able to manage control messages and to communicate with the token ET.

The token ET comprises a local server LS. The local server LS comprises three descrambling keys DKL1, DKL2 and DKL3. Advantageously, the keys DKL1, DKL2 and DKL3 may be equal to the scrambling keys DK1, DK2 and DK3.

The keys DKL1, DKL2 and DKL3 are assumed to have been deployed in a secure way during a previous phase. The setting of the descrambling keys in the client entity may be carried out through high secure session. In particular, if the token is a smart card comprising a smart card web server, the descrambling key set may be administrate in a secure way through Internet or even through OTA if the smart card has SIM features. Alternately, the descrambling keys may be stored in a hardware token before token issuance. Alternately, the descrambling keys may be dynamically generated in the hardware token from a master key or from a secret seed. In a smart card token, the descrambling keys may be generated by dedicated servlets. The generation of descrambling keys may be manages with counters that are incremented in similar way at both server and client sides.

Figure 7:
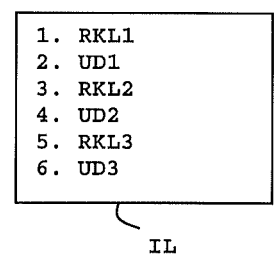
FIG. 7 depicts a second example of Index list.

FIG. 7 shows an example of Index list which may be used by the system of FIG. 6.

The index list IL comprises six elements. The first element RKL1 is a request to a descrambling key DKL1. The request RKL1 targets the local server LS. The second element UD1 is an URL where the scrambled data D1 is made reachable. The third element RKL2 is a request to a descrambling key DKL2. The request RKL2 targets the local server LS. The fourth element UD2 is an URL where the scrambled data D2 is made reachable. The fifth element RKL3 is a request to a descrambling key DKL3. The request RKL3 targets the local server LS. The sixth element UD3 is an URL where the scrambled data D3 is made reachable. According to a preferred embodiment, each request to descrambling key is placed before its set of associated URLs. In the example of FIG. 7, the key DKL1 applies to D1, the key DKL2 applies to D2 and the key DKL3 applies to D3.

Thanks to this embodiment, the descrambling keys are not transmitted on the network with the video streaming.

Advantageously, the Index list may be regularly refreshed by the server entity with new URLs.

Thanks to the invention, the server entity and the client entity may be out of sync. Thus the invention is compliant with the web cache of CDN framework over Internet.

The invention allows protecting access to data sent over a public network with a high granularity of rights.

Thanks to the invention, a video segment is ciphered with a scrambling key and all client entities may get the descrambling key associated to the video segment. The invention allows protecting access to data sent over a public network with millions of concurrent clients.

Alternately, the host machine HM may be a TV, a set-top box, a mobile phone or any device intended to receive a data distributed by the server entity SV through a public network like Internet.

Advantageously, the use of the token ET may be controlled through a value specific to the user of the token. For example, the access to the token ET may be controlled by a PIN code or a biometric value.

The invention claimed is:

1. A method comprising:
   managing access to a plurality of data from a first device for consumption by a second device through a point-to-point link, each of said data being reachable through a set of uniform resource identifiers (URIs) belonging to an index list, said second device comprising a personal token, said personal token comprising a local server;
   at the second device, receiving the index list from the first device, wherein the received index list includes, in addition to said set of URIs, at least one request that pertains to a credential for accessing data reachable through said set of URIs, wherein said request comprises a request for a control message, said control message applying to a data reachable through a uniform resource identifier (URI) belonging to the index list, wherein said request further comprises a URI targeting a remote server and wherein, in response to said request, the remote server sends both the control message coupled with a descrambling key and a re-direct request to a URI targeting the local server;
   sending the request from the second device to the local server of the personal token;
   receiving, from the personal token, a credential for accessing data reachable through at least one of said set of URIs; and
   accessing the data reachable through said at least one of said set of URIs, using the received credential, wherein said data are web streaming content.

2. A method according to claim 1, wherein said request is a request for a control message and wherein said request is the URI targeting the local server.

3. A method according to claim 1, wherein said control message applies to a set of data reachable through a set of URIs belonging to the index list.

4. A method according to claim 1, wherein said personal token is a smart card.

5. A method according to claim 1, wherein said credential is a descrambling key, and wherein said request is a URI targeting the local server.

6. A method according to claim 2, wherein said control message applies to a set of data reachable through a set of URIs belonging to the index list.

7. A method according to claim 2, wherein said personal token is a smart card.

8. A method according to claim 3, wherein said personal token is a smart card.

9. A system comprising:
   a streaming Web server configured to distribute a plurality of data to a distant device through a point-to-point link, said distant device comprising a personal token which comprises a local server, said streaming Web server comprising a processor and memory, wherein the streaming Web server is configured to:
   receive a first content request from the distant device;
   send, in response to the first content request, an index list, wherein said index list comprises a set of uniform resource identifiers (URIs) for reaching each of said data and at least one request that pertains to a credential for accessing data reachable through said set of URIs, wherein said request comprises a request for a control message, said control message applying to a data reachable through a uniform resource identifier (URI) belonging to the index list, wherein said request further comprises a URI targeting a remote server and wherein, in response to said request, the remote server sends both the control message coupled with a descrambling key and a re-direct request to a URI targeting the local server;
   wherein the request enables the distant device to obtain, from the personal token, a credential for accessing data reachable through at least one of said set of URIs, wherein said data are web streaming content.

* * * * *